(12) United States Patent
Daniels

(10) Patent No.: US 11,994,251 B2
(45) Date of Patent: May 28, 2024

(54) CELLULAR PHONE CARRIER

(71) Applicant: Tommie T. Daniels, Houston, TX (US)

(72) Inventor: Tommie T. Daniels, Houston, TX (US)

( * ) Notice: Subject to any disclaimer, the term of this patent is extended or adjusted under 35 U.S.C. 154(b) by 402 days.

(21) Appl. No.: 17/313,735

(22) Filed: May 6, 2021

(65) Prior Publication Data
US 2021/0348710 A1 Nov. 11, 2021

Related U.S. Application Data

(60) Provisional application No. 62/704,360, filed on May 6, 2020.

(51) Int. Cl.
F16M 11/04 (2006.01)
A45F 5/00 (2006.01)
F16M 11/38 (2006.01)
F16M 13/04 (2006.01)
H04B 1/3888 (2015.01)

(52) U.S. Cl.
CPC ............. F16M 11/041 (2013.01); A45F 5/00 (2013.01); F16M 11/38 (2013.01); F16M 13/04 (2013.01); A45F 2005/006 (2013.01); A45F 2200/0516 (2013.01); H04B 1/3888 (2013.01)

(58) Field of Classification Search
CPC ...... F16M 11/041; F16M 11/38; F16M 13/04; A45F 2005/006; A45F 5/00; A45F 2200/0516; H04B 1/3888
See application file for complete search history.

(56) References Cited

U.S. PATENT DOCUMENTS

| 6,366,672 | B1 | | 4/2002 | Tsay |
| 7,324,156 | B2 | | 1/2008 | Lohr et al. |
| 7,644,895 | B2 | | 1/2010 | Tseng |
| 8,560,031 | B2 | | 10/2013 | Carlson et al. |
| 8,737,066 | B1 | * | 5/2014 | Block ........................ A45F 5/00 |
| | | | | 224/217 |
| 9,345,312 | B1 | * | 5/2016 | Washio |
| 9,787,348 | B2 | * | 10/2017 | Srour ................... H04R 1/1033 |
| 10,200,518 | B2 | * | 2/2019 | Richter |
| 10,348,352 | B2 | * | 7/2019 | Barnett .................. F16M 13/00 |
| 10,419,054 | B1 | * | 9/2019 | VanTassell et al. |
| 10,463,116 | B2 | * | 11/2019 | Barnett et al. |
| 10,721,343 | B2 | * | 7/2020 | Nahum .............. F16M 11/2014 |
| 10,806,552 | B1 | * | 10/2020 | Demoss |
| 10,841,410 | B2 | * | 11/2020 | Nahum ................... H04M 1/04 |
| 10,855,826 | B2 | * | 12/2020 | Shaw ................. F16M 11/2078 |

(Continued)

FOREIGN PATENT DOCUMENTS

AU 2018249514 A1 * 10/2019 ............... A45F 5/00

Primary Examiner — Tara Schimpf
Assistant Examiner — Matthew J Sullivan

(57) ABSTRACT

A cell phone carrying device can be used alone or with a strap or other carrying mechanism to provide a secure attachment to one's person. A knob is affixed to the back of the cell phone by a strong adhesive, a sliding track, or other attachment mechanism. The knob may be used with or without the strap connection. Additional complementary docking attachments allow for use in home, car, or office. The carrying device may incorporate GPS, location, or alarm features. In some embodiments, a fob and/or the electronic components of the knob base may be paired with software applications to allow the user to customize ring tones, fob displays, or other attributes.

14 Claims, 4 Drawing Sheets

(56) References Cited

U.S. PATENT DOCUMENTS

| | | | |
|---|---|---|---|
| 10,938,433 B2* | 3/2021 | Yim et al. | |
| 10,962,169 B1* | 3/2021 | White | F16M 13/04 |
| 11,039,679 B2* | 6/2021 | Jang | |
| 11,150,744 B2* | 10/2021 | Kim | |
| 11,265,035 B1* | 3/2022 | Zhang | H04B 1/3877 |
| 11,284,525 B2* | 3/2022 | Hamilton | H04M 1/04 |
| 11,316,962 B2* | 4/2022 | Tsitron | F16M 11/38 |
| 11,317,701 B2* | 5/2022 | Beckhart | A45C 13/30 |
| 11,320,089 B2* | 5/2022 | Fabec | |
| 11,374,607 B1* | 6/2022 | Feng | |
| 11,564,480 B2* | 1/2023 | Ruddy | A45F 5/00 |
| 11,608,929 B2* | 3/2023 | Painter | F16M 13/02 |
| 11,632,453 B2* | 4/2023 | Donna | H04B 1/3888 455/575.8 |
| 11,675,254 B2* | 6/2023 | Zhou et al. | |
| 11,689,237 B2* | 6/2023 | Kim | H04M 1/04 455/575.1 |
| 11,712,115 B2* | 8/2023 | Cheney et al. | |
| 11,724,651 B2* | 8/2023 | Kazempour | |
| 2011/0284599 A1* | 11/2011 | Sternick | A45F 5/00 224/191 |
| 2015/0257288 A1* | 9/2015 | Livernois | H04M 1/04 248/346.06 |
| 2018/0359346 A1* | 12/2018 | Chen | F16M 13/00 |
| 2019/0089822 A1* | 3/2019 | Gartz | F16M 11/14 |
| 2019/0208046 A1* | 7/2019 | Gluck | H04M 1/21 |
| 2019/0211966 A1* | 7/2019 | Nahum | F16M 13/04 |
| 2019/0243419 A1* | 8/2019 | Charlesworth | A45C 11/00 |
| 2019/0304291 A1* | 10/2019 | Camp | G08B 25/009 |
| 2020/0037737 A1* | 2/2020 | Cantoli-Alves | H04M 1/04 |
| 2020/0127694 A1* | 4/2020 | Lim | H04B 1/3877 |
| 2020/0328017 A1* | 10/2020 | Isenberg | B60R 11/0241 |
| 2020/0329133 A1* | 10/2020 | Surani | A45F 5/00 |
| 2020/0344344 A1* | 10/2020 | Friedel | F16M 11/10 |
| 2021/0045516 A1* | 2/2021 | Beckhart | A45F 5/00 |
| 2021/0140580 A1* | 5/2021 | Nahum | A45C 11/00 |
| 2021/0315366 A1* | 10/2021 | Licitra | A45C 11/00 |
| 2021/0345763 A1* | 11/2021 | Ramirez | A47L 25/00 |
| 2021/0348710 A1* | 11/2021 | Daniels | F16M 11/38 |
| 2022/0116491 A1* | 4/2022 | Chiang | F16M 11/38 |
| 2022/0117384 A1* | 4/2022 | Whitten | F16M 13/022 |
| 2022/0128194 A1* | 4/2022 | Snow | F16M 11/2021 |
| 2022/0166868 A1* | 5/2022 | Whitten | F16M 11/105 |
| 2022/0183431 A1* | 6/2022 | Chiang | A45C 13/001 |
| 2022/0191314 A1* | 6/2022 | McKay | A45F 5/00 |
| 2022/0403971 A1* | 12/2022 | Von Bargen | F16M 11/105 |
| 2023/0065472 A1* | 3/2023 | West | H04M 1/04 |
| 2023/0128108 A1* | 4/2023 | Wang | H04M 1/04 294/142 |
| 2023/0228290 A1* | 7/2023 | Hughes | F16M 13/022 455/575.8 |

* cited by examiner

CELLULAR PHONE CARRIER

CROSS REFERENCE TO RELATED APPLICATIONS

This application claims priority to provisional application No. 62/704,360, filed on May 6, 2020, the entirety of which is incorporated herein by this reference thereto.

TECHNICAL FIELD

Embodiments relate to devices for securely carrying cellular phone devices.

BACKGROUND

It is difficult to carry a cell phone comfortably while engaged in physical activities such as sporting activities and the like. In such cases, hands free operation is not possible. A cell phone can easily become dislodged from a pocket or become completely separated from the person. Currently there exist various clips and cases that can attach to a cell phone, but not in such a secure manner as to carry it comfortably and safely while engaged in physical activity. Existing devices are either uncomfortable, or do not attach the cell phone securely enough to remain safe during physical activities or exercise. A device is needed to allow the cell phone to be securely attached to the person, but still able to be detached quickly in order to answer calls or take pictures if the need arises. Such a device could be decorated with different patterns or branding to appeal to a user's sense of style. Such a device could also have the ability to attach various functional accessories. Thus, it would be advantageous to provide a cellular phone carrier that had all of these properties.

SUMMARY

Embodiments allow one to carry a cell phone while engaged in physical or sports activities. Embodiments can be used in one of two or more ways. For example, embodiments can be used as a stand-alone phone carrier or it can be attached to the user for hands-free transport. Embodiments comprise a flexible cone having a thick outer ring that functions as a knob by which a user can carry the phone. When in use the knob expands, the cell phone to be held by the user's hand. When not in use, the knob is stored out of the way, compressed into the back of the phone.

The flexible cone is part of a detachable upper knob assembly, which is attached to a knob base. The knob base attaches to the back of a phone by, for example an adhesive, a hook and loop mechanism, or any other such mechanism. The knob base may contain a compartment with a steel disc to attract to a magnet in an accompanying strap or other accessory. The knob base may also contain a quick-disconnect mechanism for attaching the strap, or any such mechanism.

Embodiments allow the user to attach the carrier to his pant waist band or belt by a hooking strap as a way of hands-free transport. The strap has a look similar to that of a watch strap. The length is adjustable, and the strap consists of two mating strap sections. One strap section has a hook on one end to fasten to a waist band or belt, and the other strap section attaches to a magnet by a pin connection. The two pieces are mated together and held in place by two metal belt studs and two movable cross tie pieces. Other embodiments allow the user to attach the carrier in other ways, including but not limited to a carabiner, a belt clip, a neck strap, an arm band, or a cross-body strap.

Once the strap is secure with the two metal studs and tie pieces, the strap can be mated with the knob base that is attached to the phone. For aesthetic reasons, the knob uses a rubber cover to conceal the steel plate when the strap is not attached. When the strap is attached, the rubber cover goes over the strap to protect and conceal the steel plate. The rubber cover is movable but yet attached to the knob housing so that it stays attached to the knob and is not lost. The knob housing and collapsible rubber ring are connected to the knob base via spring loaded hooking catch mechanism or other such mechanism. Other embodiments of the invention still allow for quick disconnect and a secure re-connect of the strap to the knob base. In other embodiments, the steel plate is present on top of electronics components housing to allow the user to affix the cell phone to a magnet in a mounted accessory.

BRIEF DESCRIPTION OF THE FIGURES

The detailed description of some embodiments of the invention is made below with reference to the accompanying drawings, wherein like numerals represent corresponding parts of the figures.

DETAILED DESCRIPTION OF THE INVENTION

Figure 1:
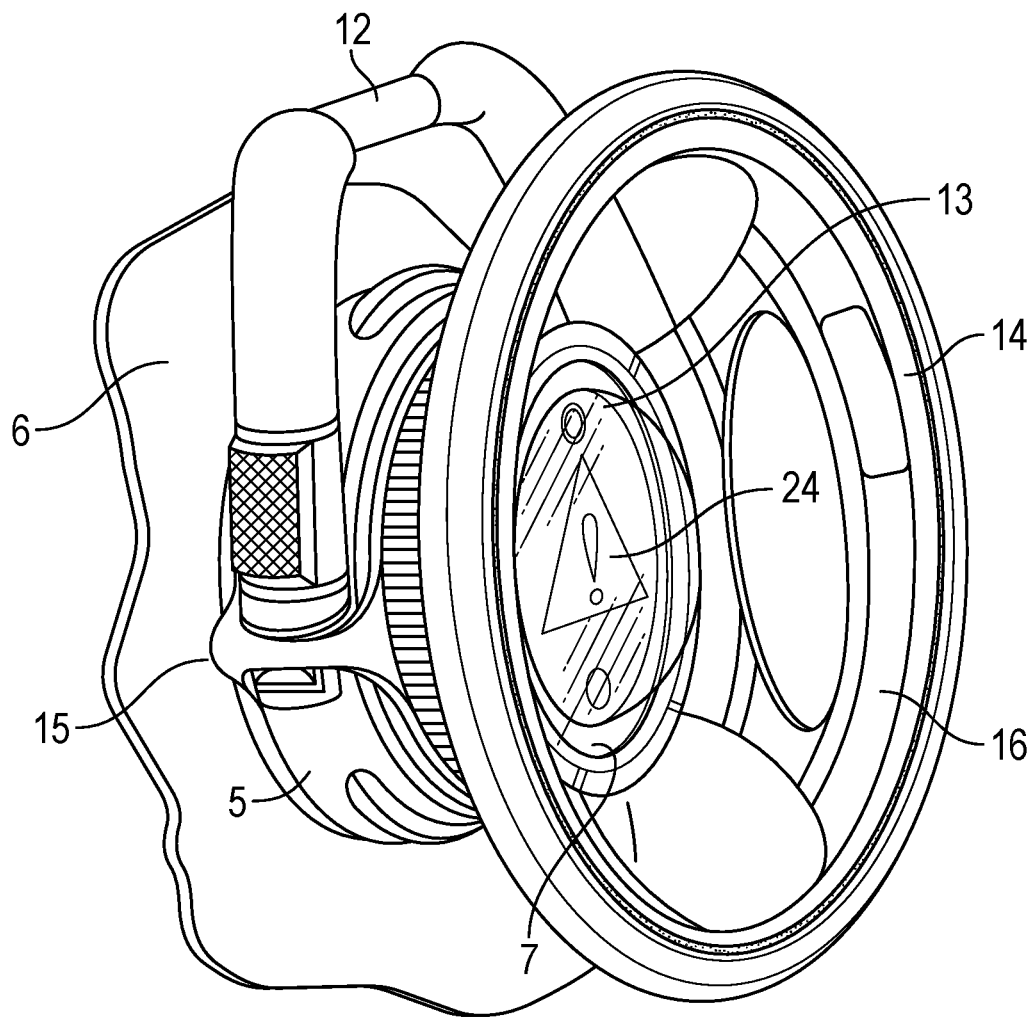
FIG. 1 illustrates an isometric view of the carrying device showing certain features of the invention.

The present invention is more readily described with references to FIGS. 1-6.

In one embodiment, the cell phone carrier is attached to the waistband of pants or a belt by a hooking strap section. This hooking strap section is connected to a second strap section by two metal strap studs and two movable cross strap ties to form one larger strap. The two strap sections are thus connected in a manner similar to a watch band and the total length of the combined strap can be adjusted accordingly. This is only one embodiment of the strap, and other connection methods could be used to both fasten the strap section together and to fasten the hooking strap section to the person.

In one embodiment, the second strap section has a strong magnet on the opposite side from which it connects to the first strap. This magnet is attached to the second strap section by, for example, a pin connection, or any similar connection. The connecting pin in one embodiment is situated roughly in the center of the magnet.

The upper knob assembly 7 and knob base 5 attach to the cell phone 6 by, for example an adhesive, a hook and loop mechanism, a sliding track mechanism, a vacuum mechanism, or any other such mechanism to create a strong connection and to ensure the phone is not lost or separated from the wearer during physical activity. The knob base is of sufficient size to support the phone's weight, but not so large that it cannot be gripped comfortably. In one embodiment, the knob base has a dome shaped housing cover to conceal a cavity containing a steel disc to attract the magnet end of the strap, and to thus secure the strap to the knob base and the cell phone itself. In one embodiment, the upper knob assembly contains a flexible cone which can be extended for better gripping by the user, or collapsed, to save space. The flexible cone may be replaced by the user and may come in a variety of colors and patterns. The flexible cone may also contain LEDs to illuminate the phone. The upper knob assembly is detachable from the knob base by, for example, a push button, a latch, or a screw-in mechanism, or any such mechanism.

In one embodiment, once the combined strap assembly is secured by the two metal studs and tie pieces, the strap may be mated with the phone to allow the phone to be worn on the person. The strap attaches to the phone via a magnet or a pair of rotating attachment points 15. The magnet is attracted to a steel disc 10 that is embedded in the silicone knob bottom or on top of the electronics housing and thus provides a secure connection. The steel disc may be covered by a cushion or film to prevent scratching. The user is then free to perform physical activities, without worrying about the cell phone becoming detached and/or damaged. However, the strap may still be detached quickly via a quick-disconnect latches or pins, if the user wishes to, for example, answer or place a call, or take a picture.

In other embodiments, the knob base may attach to various carrying or mounting mechanisms, both on the person or in an office or vehicle. On person carrying devices may include, but are not limited to, a carabiner, a belt clip, a neck strap, an arm band, or a cross-body strap. Mounting devices include but are not limited to a dash-mount, or other vehicle mount, or a freestanding adjustable desk mount.

FIG. 1 illustrates an isometric view of the carrying device showing certain features of the invention. In some embodiments, a handle 12 is attached to the knob base 5 by a pair of rotating attachment points 15. This handle allows the strap or other carrying mechanism to be attached to the knob base and the rest of the carrying device, and to be quickly detached by operation of a push button. The center of the upper knob assembly 7 and knob cavity 24 is covered by a clear dome 13 of translucent plastic or other similar material. In some embodiments, the collapsible cone 16, which attaches to the upper knob assembly, may contain an ID insert 14 that displays the model ID, user information, such as emergency contact, and other identifying features.

The upper knob assembly contains a flexible cone 16 which can be extended for better gripping by the user, or collapsed, to save space. The collapsible cone 16 is shown in both the extended (top) and collapsed (bottom) positions. The flexible cone may be replaced by the user and may come in a variety of colors and patterns. The flexible cone may also contain LEDs to illuminate the phone. In some embodiments, the knob base is attached to a track that allows it to slide to different positions on the back of the phone 6. After sliding to the desired position, the user may tighten the retainer ring 17 to secure the knob base in one position. The rotating strap attachment points 15 freely rotate below the retainer ring.

Figure 2:
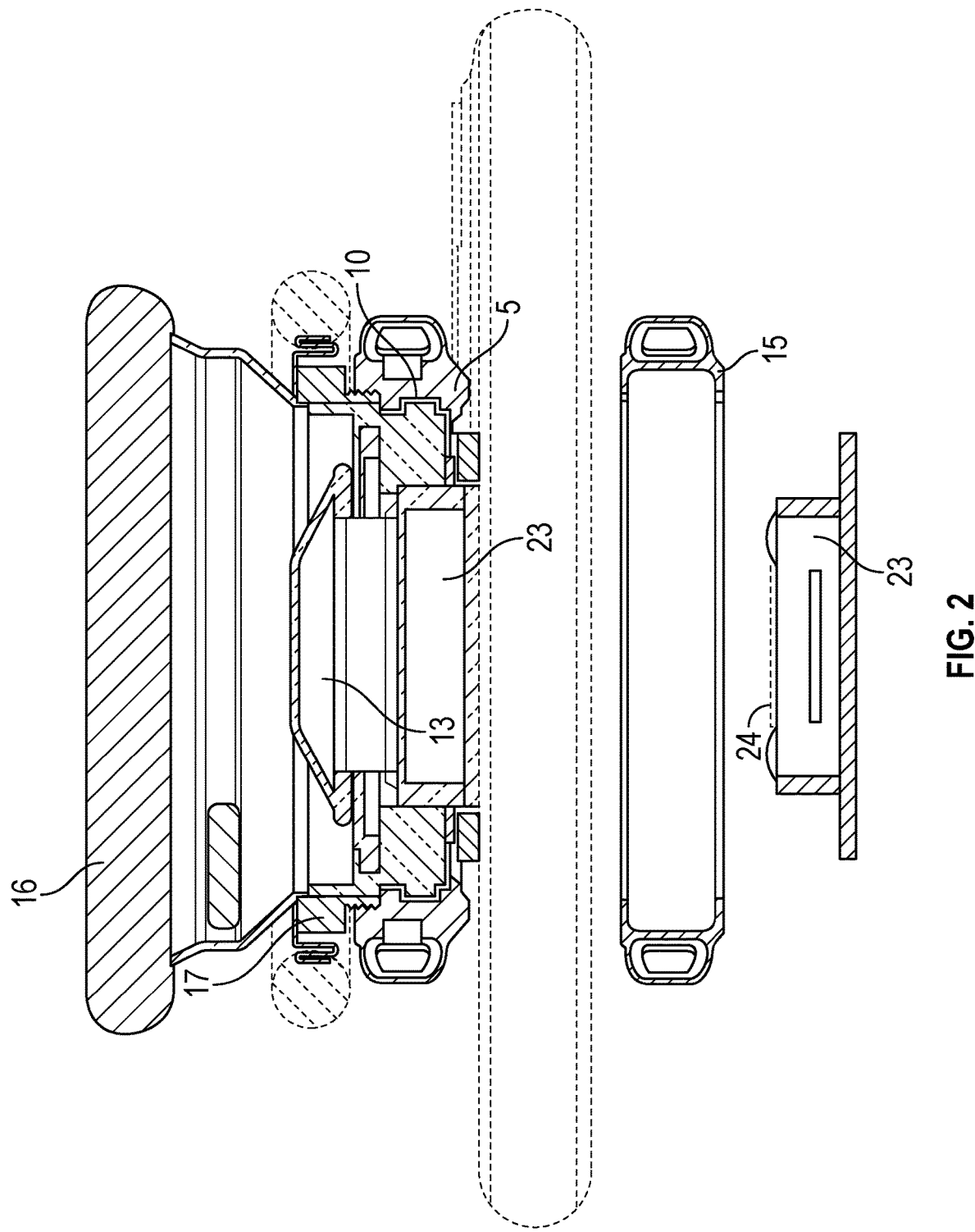
FIG. 2 shows a sectional side view of the phone carrier assembly, in accordance with the present invention.

FIG. 2 illustrates a cutaway side view of the carrying device. In some embodiments, the knob base 5 contains an electronics housing 23. By pressing down on the dome 13, the user can activate the alarm, or other functions of the knob base. When the user presses down on the dome, the diaphragm stretches and electrical contacts in the dome are able to connect to contacts in the alarm element, thus triggering the device.

Figure 3:
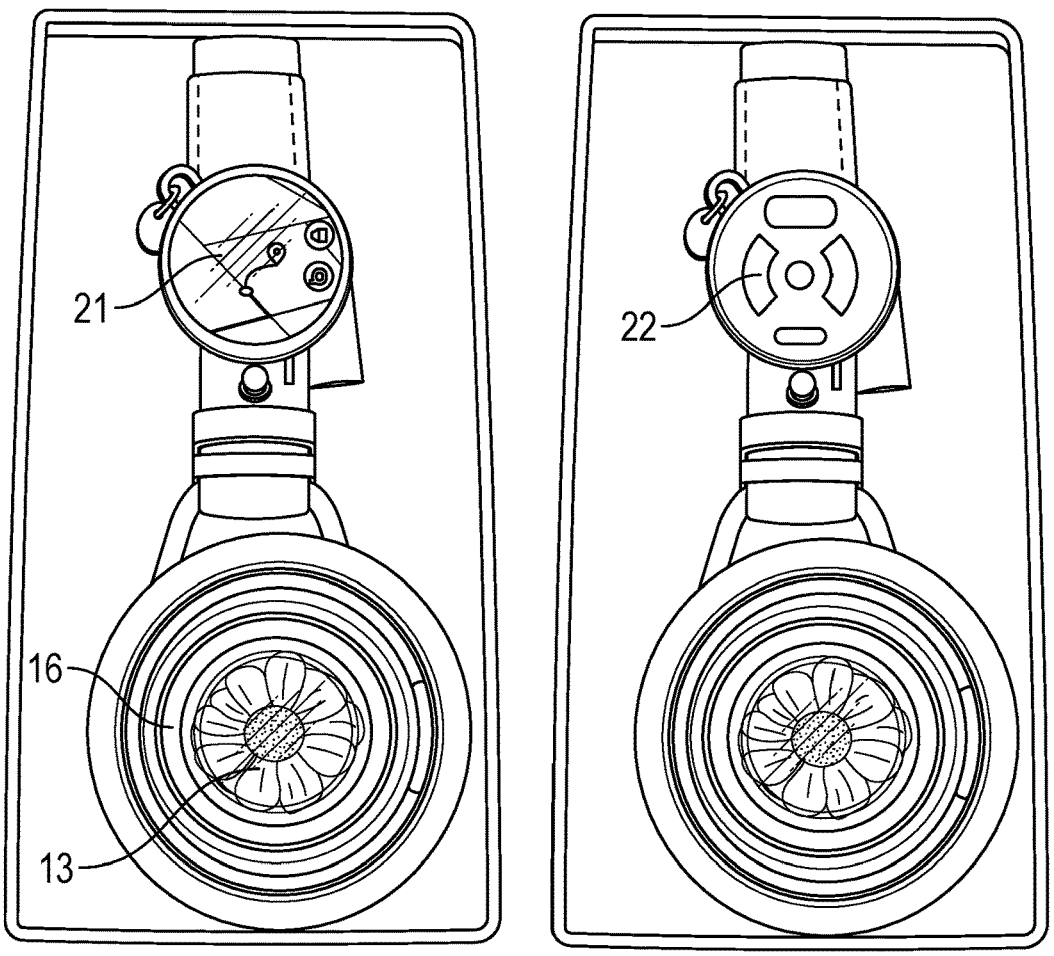
FIG. 3 shows a top down view of the cell phone carrier assembly along with optional strap and fob, in accordance with the present invention.

In some embodiments, the strap, or other carrying or mounting mechanism, may allow the attachment of an interchangeable fob, as illustrated by FIG. 3. The fob may function as, for example, but not limited to, an alarm 21, a GPS unit 22, or a phone locator. The fob may be configured to vibrate or emit noise in response to alerts sent from the phone. The fob may also be purely decorative and display a design or company logo, which may be customizable by the user. In some embodiments, the clear dome 13 may function as a push button to active an alarm or panic safety device. In some embodiments, the fob and/or the electronic components of the knob base may be paired with software applications to allow the user to customize ring tones, fob displays, or other attributes.

Figure 4:
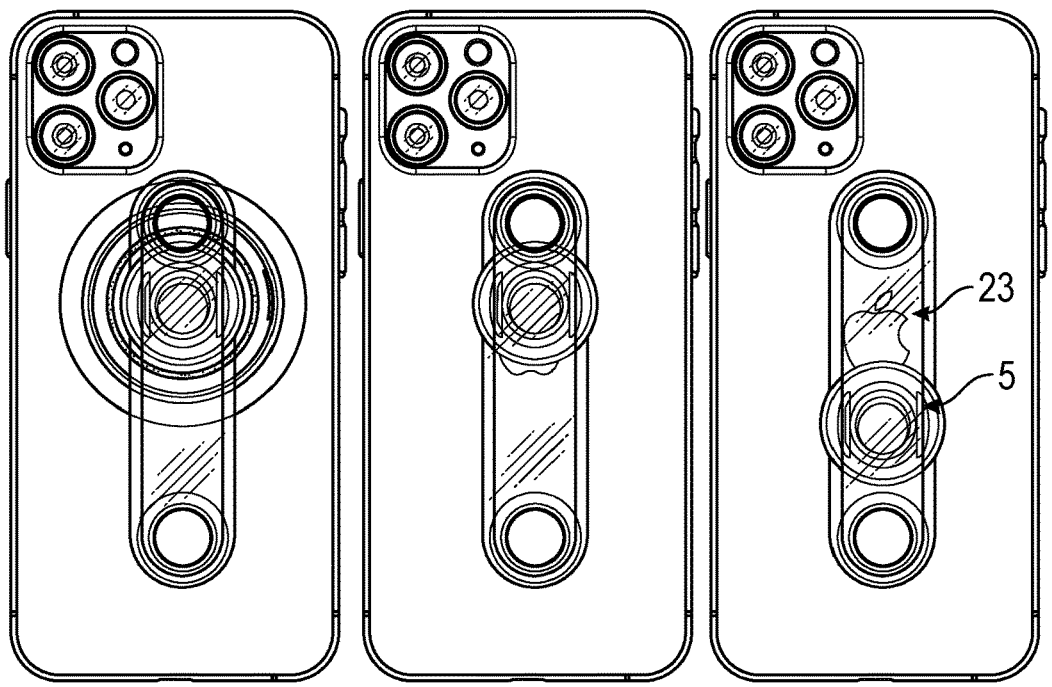
FIG. 4 shows a back view with the optional sliding track feature visible, in accordance with the present invention.

FIG. 4 illustrates a back view of the carrying device where the optional sliding track feature 23 may be seen. In some embodiments, the knob base 5 may be slotted into the track feature allowing it to be positioned anywhere along the range of the track. The knob base fits into the sliding track via a flange on the knob base or similar mechanism. The track may be attached to the back of the phone by a strong adhesive, or any such mechanism. When the user adjusts the knob base to the desired position along the track, the knob base may be secured in place by the retaining ring 17 as seen in FIG. 2.

Figure 5:
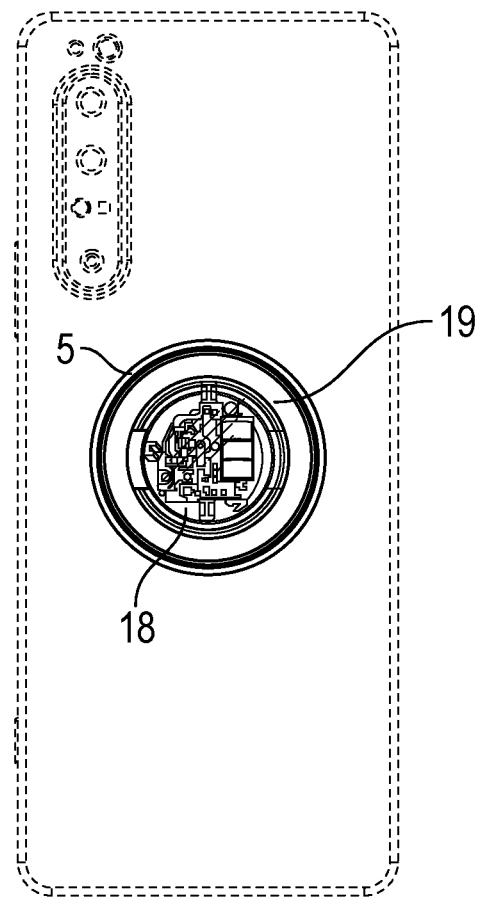
FIG. 5 shows a cutaway view of the back of the phone, allowing the position of internal electronic elements to be visible, in accordance with the present invention.

FIG. 5 illustrates a back cutaway view of the phone where some of the inner workings of the knob base may be seen. In some embodiments, the knob base 5 contains a protected battery housing 18 to power any electronic features attached to the carrying device. Some embodiments of the invention attach to the phone by a ring of adhesive 19 applied to the bottom of the knob base, surrounding the battery housing. In some embodiments, the upper knob assembly may be detached from the knob base by a quick release button 20 on the side of the knob base.

Figure 6:
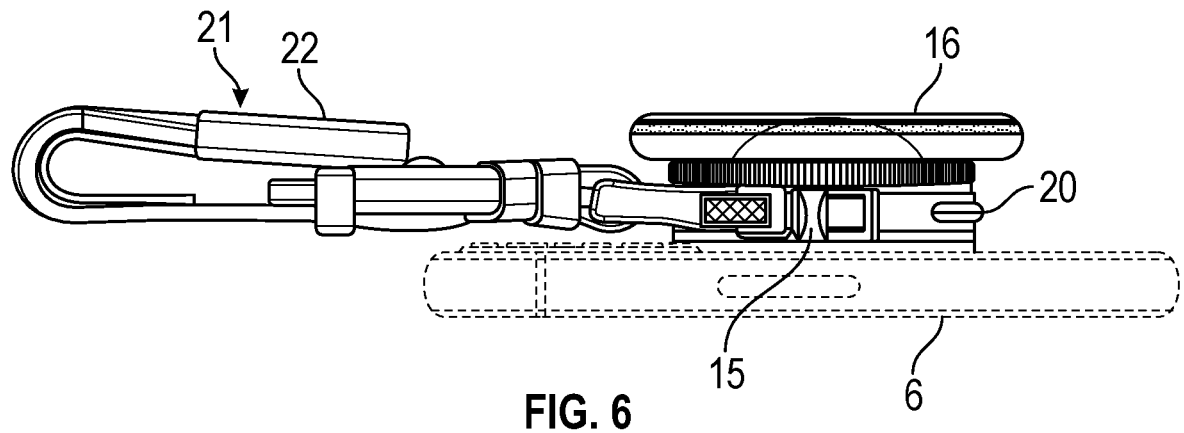
FIG. 6 shows a side view of the cell phone carrier assembly along with optional strap and fob, in accordance with the present invention.

FIG. 6 illustrates a side view of the cell phone carrier assembly along with optional strap and fob. In some embodiments, the strap will be attached to a fob by a snap or other such attachment feature which may function as an alarm 21, a GPS unit 22, or other such function. Also illustrated is one of the rotating attachment points 15 by which the strap or other feature may be attached to the knob base. In some embodiments this is a hooking strap as shown in this drawing. The collapsible cone 16 is shown in the compressed position.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

I claim:

1. An attachment apparatus, comprising:
a knob base configured to support a mobile device while a user is engaged in physical activity, the knob base comprising:
   a substantially flat backing configured for adherence to a mobile device;
   a knob cavity containing therein a handle that provides a strap attachment site; and
   a dome shaped cover configured to conceal knob cavity; and
an upper knob assembly, for detachable engagement with said knob base, said upper knob assembly comprising:
   a flexible cone operable between an extended position that provides a gripping surface and a collapsed position; and
   a release mechanism for selectably engaging said upper knob assembly with, and disengaging said upper knob assembly from, said knob base;
a strap having two mating strap sections held in place by two metal studs that extend through apertures formed in the strap, and by two movable strap ties;
wherein the studs are positioned to allow adjustment of the strap length; and
wherein a first strap section is positioned furthest from the mobile device and comprises a hooked end to secure the strap to a person
a magnetic connection in the knob base for attaching the knob base to said strap;
wherein the second strap section has a magnet on one end to attach to a steel disc in the knob base; and
a metal pin for securing the strap to the magnet.

2. The apparatus of claim 1, further comprising:
a quick-disconnect latch for attaching the knob base to said strap.

3. The apparatus of claim 1, further comprising:
a fob housing any of GPS, location, or alarm elements;
wherein the fob is attachable to the strap.

4. The apparatus of claim 1, further comprising:
an insert within the knob base that is pairable with any of alarm and notification functions provided by the mobile device.

5. The apparatus of claim 1, further comprising:
an insert to the knob base for displaying decorative designs.

6. An attachment apparatus, comprising:
a sliding track mechanism configured to allow attachment of a knob base to a mobile device, the sliding track mechanism comprising:
   a substantially flat backing member configured for adherence to a mobile device;
   an extended slot configured for attachment of a knob base;
said knob base configured to support a mobile device while a user is engaged in physical activity, the knob base comprising:
   a backing with a base member configured to engage within extended slot of the sliding track, wherein the knob base is positionable along the track to a selected position;
   a knob cavity containing therein a handle that provides a strap attachment site; and
   a dome shaped cover configured to conceal knob cavity; and
an upper knob assembly for detachable engagement with said knob base, said upper knob assembly comprising:
   a flexible cone operable between an extended position that provides a gripping surface and a collapsed position; and
   a release mechanism for selectably engaging said upper knob assembly with, and disengaging said upper knob assembly from, said knob base;
a strap having two mating strap sections held in place by two metal studs that extend through apertures formed in the strap, and by two movable strap ties;
wherein the studs are positioned to allow adjustment of the strap length; and
wherein a first strap section is positioned furthest from the mobile device and comprises a hooked end to secure the strap to a person
a magnetic connection in the knob base for attaching the knob base to said strap;
wherein the second strap section has a magnet on one end to attach to a steel disc in the knob base; and
a metal pin for securing the strap to the magnet.

7. The apparatus of claim 6, further comprising:
a quick-disconnect latch for attaching the knob base to said strap.

8. The apparatus of claim 6, further comprising:
a fob housing any of GPS, location, or alarm elements;
wherein the fob is attachable to the strap.

9. The apparatus of claim 6, further comprising:
an insert within the knob base that is pairable with any of alarm and notification functions provided by the mobile device.

10. An attachment apparatus, comprising:
a sliding track mechanism configured to allow attachment of a knob base to a mobile device, the sliding track mechanism comprising:
   a substantially flat backing member configured for adherence to a mobile device;
   an extended slot configured for attachment of a knob base;
said knob base configured to support a mobile device while a user is engaged in physical activity, the knob base comprising:
   a backing with a base member configured to engage within extended slot of the sliding track, wherein the knob base is positionable along the track to a selected position;
   a knob cavity containing therein a handle that provides a strap attachment site; and a dome shaped cover configured to conceal knob cavity; and a flexible diaphragm positioned under the dome shaped cover, configured to allow the dome shaped cover to be pressed down in order to activate an alarm or other mechanism;

an upper knob assembly for detachable engagement with said knob base, said upper knob assembly comprising:

a flexible cone operable between an extended position that provides a gripping surface and a collapsed position; and a release mechanism for selectably engaging said upper knob assembly with, and disengaging said upper knob assembly from, said knob base;

a strap having two mating strap sections held in place by two metal studs that extend through apertures formed in the strap, and by two movable strap ties;

wherein the studs are positioned to allow adjustment of the strap length; and wherein a first strap section is positioned furthest from the mobile device and comprises a hooked end to secure the strap to a person a magnetic connection in the knob base for attaching the knob base to said strap;

wherein the second strap section has a magnet on one end to attach to a steel disc in the knob base; and a metal pin for securing the strap to the magnet.

11. The apparatus of claim 10, further comprising:

a quick-disconnect latch for attaching the knob base to said strap.

12. The apparatus of claim 10, further comprising:

a fob housing any of GPS, location, or alarm elements;

wherein the fob is attachable to the strap.

13. The apparatus of claim 10, further comprising:

an insert within the knob base that is pairable with any of alarm and notification functions provided by the mobile device.

14. The apparatus of claim 10, further comprising:

an insert to the knob base for displaying decorative designs.

* * * * *